United States Patent [19]
Forster

[11] 3,829,762
[45] Aug. 13, 1974

[54] METHOD AND DEVICE FOR MAGNETOGRAPHIC INSPECTION

[76] Inventor: Friedrich M. O. Förster, Grathwohlstrasse 4, D-7410 Reutlingen, Germany

[22] Filed: Aug. 6, 1973

[21] Appl. No.: 385,999

[30] Foreign Application Priority Data
Aug. 8, 1972 Germany............................ 2239014

[52] U.S. Cl. ................................................ 324/37
[51] Int. Cl............................................ G01r 33/12
[58] Field of Search................................ 324/37, 38

[56] References Cited
UNITED STATES PATENTS

| | | | |
|---|---|---|---|
| 2,994,032 | 7/1961 | Hansen | 324/38 X |
| 3,262,053 | 7/1966 | Nasir et al. | 324/37 |
| 3,267,367 | 8/1966 | Izumiyama | 324/37 |
| 3,435,336 | 3/1969 | Greiner et al. | 324/37 |
| 3,491,288 | 1/1970 | Forster | 324/37 |
| 3,534,258 | 10/1970 | Forster | 324/37 |

*Primary Examiner*—Stanley T. Krawczewicz
*Attorney, Agent, or Firm*—George J. Netter, Esq.

[57] ABSTRACT

Clamps are received onto a pipe and include ferromagnetic portions which bridge the circumferential pipe regions being tested. A band shaped magnetizing coil is not moved during test so that radial forces do not have to be taken into consideration. Thus, extremely high magnetizing field intensities are permissible without adverse practical effect. The return of the magnetic flow over the clamps results in a magnetic circuit which is, for all practical purposes, closed. The ferromagnetic clamps collect the magnetic lines of force which would otherwise have closed over the air, and in this manner amplify the magnetic flux passing through the pipe. A storage tape is applied directly to the pipe, over which the magnetizing coil and clamps are arranged.

10 Claims, 4 Drawing Figures

METHOD AND DEVICE FOR MAGNETOGRAPHIC INSPECTION

BACKGROUND OF THE INVENTION

This invention relates generally to a device and method for magnetographically inspecting portions of the circumference of a pipe for defects.

Magnetographic inspection is a non-destructive method for inspecting ferromagnetic components for defects on and beneath the surface, in which the surface of the part to be inspected is placed in contact with a magnetic storage tape, the part is then magnetized while maintained in contact with the storage tape, and subsequently the storage tape is scanned in a suitable manner after being removed. While the part to be inspected is magnetized, magnetic leakage flux emanates from the part surface at defect locations and is stored in the magnetic storage tape carried by the part. With suitable scanning of the tape, the location and intensity of the defect can be determined. Magnetography is used extensively for defect inspection of parts of many different kinds. The automated application of magnetography for the inspection of longitudinal pipe welds is disclosed in U.S. Patent No. 3,491,288.

For some time, efforts have been made to expand magnetography to the inspection of cross welds in pipes, i.e., welds which extend transversely of the pipe. This has been done in the following manner. Magnetic storage tape is placed around the pipe on the weld to be inspected. The two poles of a magnet yoke are placed on the surface of the pipe, one in front of and the other behind the weld, so that the weld is penetrated by magnetic flux at approximately right angles to the cross weld. The magnet yoke, which may be equipped with rollers of non-ferromagnetic material, is then moved around the pipe periphery once, so that the weld is subjected to the magnetic flux along the entire circumference of the pipe. Then, the magnetic storage tape is removed and scanned. Although occasionally usable results can be achieved with this method, there are several disadvantages. First of all, the relatively heavy magnetizing yoke is not easy to handle, especially with pipes of large diameter. Moreover, greater wall thicknesses necessitate correspondingly greater magnetizing currents to ensure sufficient magnetization of the wall of the pipe, and thus larger and heavier magnetizing yokes. Of course, the larger the yoke the greater the attraction between the wall of the pipe and the magnetizing yoke. With all thicknesses greater than about 10 mm, the radial attraction is so great that a corresponding magnetizing yoke can no longer, for all practical purposes, be moved when a current which is dimensioned for sufficiant magnetization flows through the yoke coil.

Arrangements are known from magnetic particle testing technology in which the pipe is wound with several turns of a copper cable on both sides of the weld to be inspected, the resulting windings connected in series, and a magnetizing current passed through them. If the area between the two windings is first treated with a suspension containing magnetic particles, the particles will collect at the locations where defect leakage flux exists, thereby indicating the defect locations to the inspector. However, the attempt to also utilize this magnetization technology for magnetography at cross welds has proved to be impractical. A portion of the lines of force of the two above mentioned windings leaves the surface of the pipe in the space between the two windings surrounding the corresponding winding in annular paths. In this manner, in addition to the axial components desired for the leakage flux inspection, radial components of the magnetic field also result, which are directed in the opposite direction, depending upon from which of the two windings they initiate. If both windings have an equal number of turns, the radial components of the magnetic field compensate in the middle between the two windings, i.e., approximately at the weld, and increase greatly in field intensity, starting from the middle, to the left and the right, each with opposite polarity. Since inspection should include not only the weld itself, but also the surrounding area, and since the two windings are not always located symmetrically relative to the weld, a portion of the radial magnetic field components is in the area to be inspected. It can be shown that the presence of a radial magnetic field component has an unfavorable effect on the results of the magnetographic inspection, and, in particular, this is expressed in an unacceptably high increase in the interference level. A further disadvantage of the above described magnetization technology is that undesirably high currents are required to achieve the necessary field intensity.

OBJECTS AND SUMMARY OF THE INVENTION

It is an object of the invention to provide an improved method and device for accomplishing reliable magnetographic inspection of areas of ferromagnetic pipes extending over the circumferential surface of a pipe.

Another object is the provision of a method and device for defect testing of cross welds in pipe and forming a magnetographic record thereof.

A still further object is the provision of a method and device for magnetographic testing of pipe in which the magnetizing means secures the recording tape onto the pipe.

Yet another object is the provision in a method and device for magnetic detection of defects in pipe, of means for confining the magnetic flux within the pipe in the test region thereof.

In the practice of the subject invention, magnetizing clamping means are received onto the pipe and includes ferromagnetic portions which bridge the circumferential pipe regions being tested. Since the magnetizing means is not moved during test, the radial forces do not have to be taken into consideration. Thus, extremely high magnetizing field intensities are permissible without adverse practical effect. The return of the magnetic flow over the clamps results in a magnetic circuit which is, for all practical purposes, closed. The ferromagnetic clamps collect the magnetic lines of force which would otherwise have closed over the air, and in this manner amplify the magnetic flux passing through the pipe. With a given magnetizing current, this provides a high magnetic flux in the cross section of the pipe axially. As opposed to the arrangement in which a magnet yoke is moved around the circumference of the pipe, the magnetizing current need only be maintained for a very brief period. Also advantageous is the fact that since magnetizing means is band shape and presses against the pipe circumference, it can also serve to press the magnetic storage tape onto the surface of the area to be inspected. Finally, as opposed to conductors with circular cross section, for example, band-shaped conductors of the magnetizing means provided for in this invention also permits optimum utilization of the cross sectional area available on the surface of the pipe being inspected.

DESCRIPTION OF PREFERRED EMBODIMENTS

Figure 1:
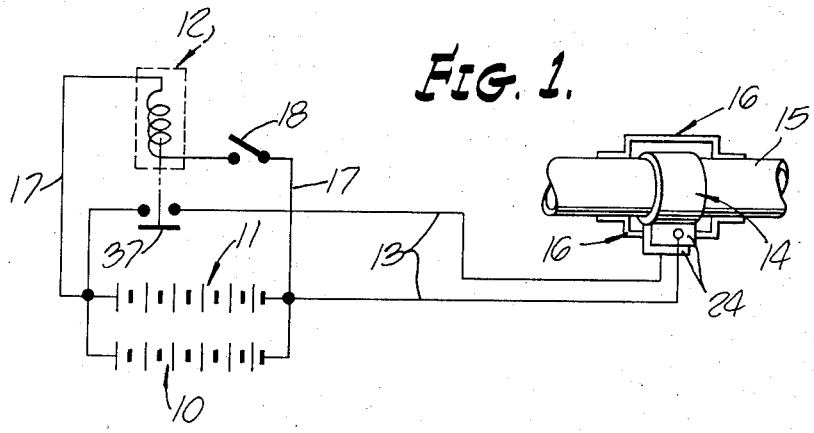
FIG. 1 is a schematic depiction of a device operating according to the method of this invention.

With reference now to FIG. 1, two batteries, 10 and 11, arranged in parallel, are connected via a heavy-current relay 12 and a cable 13 with a conductor arrangement 14 which is wound around the pipe 15 to be inspected below ferromagnetic clamps 16. Current is provided to the coil of the relay 12 by means of leads 17 under the control of a switch 18.

Figure 3:
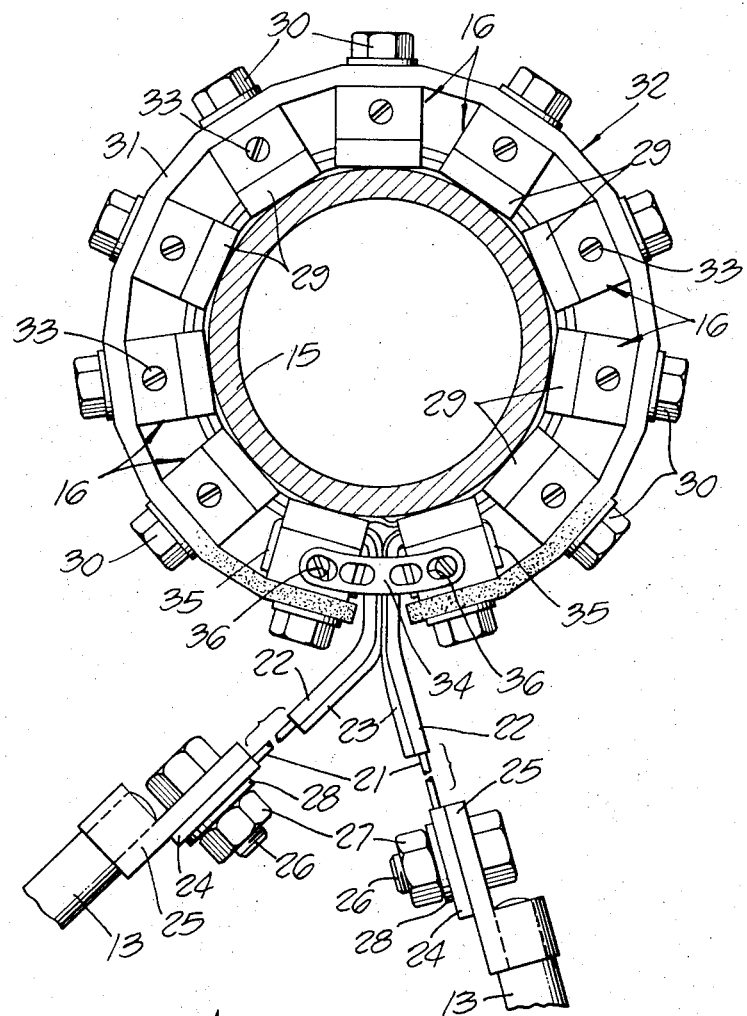
FIG. 3 is a transverse sectional view.
Figure 2:
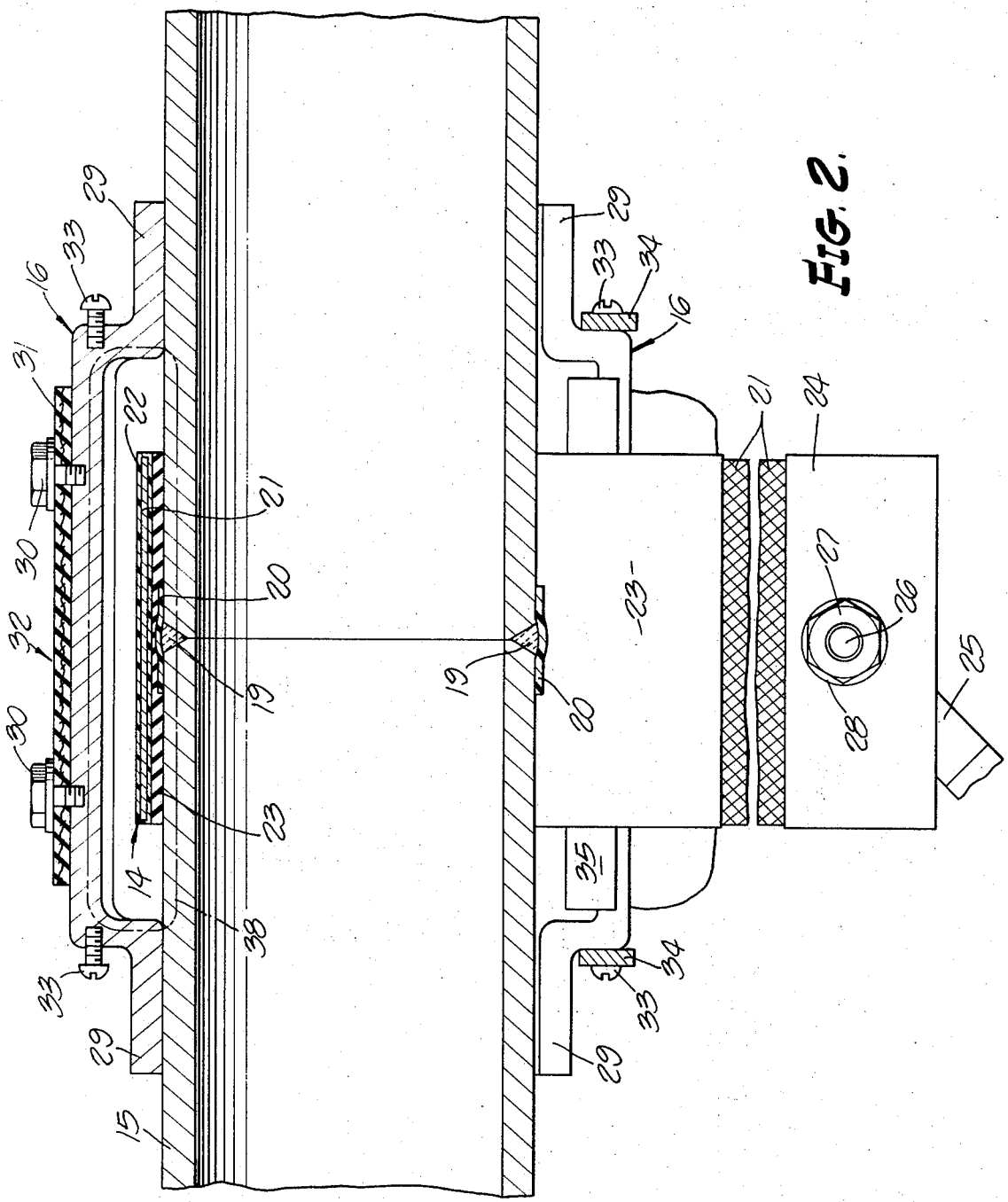
FIG. 2 is a longitudinal sectional view through the device received on a test pipe as in FIG. 1.

Reference is now made simultaneously to both FIG. 2 showing a detailed longitudinal section view and FIG. 3 a detailed cross section of the portion of pipe to be inspected. A cross weld 19 to be tested is surrounded entirely by a magnetic storage tape 20, the ends of which may be secured together by an adhesive strip (not shown). The conductor arrangement 14 wound about the storage tape comprises a band-shaped conductor 21 of braided fine copper wires, for example, a sheath 22 surrounding and insulating the braided conductor, and a coating 23 of foam rubber adhesively secured to the flat inner surface of the sheath. This coating 23 resiliently adapts to its substrate and uniformly presses the storage tape 20 against the surface of the pipe in the area of the weld 19. The ends of the conductor 21 are reinforced by flat sleeve electrodes 24. A good conductive connection can be produced between the sleeve electrode and cable lugs 25 connected to the ends of the heavy-current cable 13 by means of bolts 26, nuts 27 and washers 28. Instead of the screw connection, a quick-release clamp connection may be provided on at least one side.

A plurality of clamps 16 formed from soft bands of iron are distributed about the pipe circumference as shown in FIG. 3. Each of the clamps is generally U-shaped with ends 29 bent outwardly at right angles. All clamps 16 are located equidistantly about the pipe circumference by means of screws 30 and a rubber strip 31 reinforced with fabric plies forming a girdle 32. Threaded studs 33 are arranged on the sides of the clamps 16 via which the girdle 32 formed by the clamps 16 and the rubber strip 31 is secured in place on the pipe by two links 34. The two clamps 16 held together by links 34 have two shaped parts 35 which cause the two ends of the conductor arrangement 14 to be held together simultaneously with the girdle 32.

To perform the method according to the invention, it is first necessary to place the magnetic storage tape 20 around the weld 19 to be inspected. The width of the storage tape 20 is selected such that a substantial area on both sides of the weld, which is also to be included in the inspection, is well covered by the tape. Both ends of the storage tape are overlapped and secured together by a suitable adhesive strip. Next, the conductor arrangement 14 is wound over the storage tape with the foam rubber coating 23 contacting the pipe outer surface and weld. Care must be taken to ensure that the conductor arrangement 14 protrudes equally beyond both edges of the storage tape for a purpose to be described later. In a practical construction, one side of the conductor arrangement 14 is maintained connected with the cable 13 at all times, while the other side is connected to the cable 13 each time the conductor arrangement is wound around the pipe and storage tape. The girdle 32 with the clamps 16 is then placed around the pipe and symmetrically arranged with the conductor arrangement 14. After the shaped parts 35 have been placed on the two lowest clamps, the girdle 32 is pulled together by the free ends of the strip 31 and locked in place by inserting the links 34 with their respective matching holes 36 onto the studs 33 of the two bottom clamps 16. The two ends of the conductor 14 are now pulled downward, firmly establishing a tight fit of the conductor arrangement 14, and thus the storage tape 20. The mutual friction of the two ends of the conductor and their friction with the shaped parts 35 prevents inadvertent loosening of the various parts.

After the arrangement as illustrated in FIGS. 2 and 3 has been achieved, which is readily possible in less than a minute, the portion of the pipe to be inspected is magnetized. This is accomplished by closing the switch 18 briefly (approximately 1 to 2 seconds). During this time, a powerful D.C. magnetizing current, sufficient to magnetize the portion of the pipe to be inspected to saturation, flows through the conductor arrangement via the relay contact 37.

In FIG. 2, the course 38 of the magnetic field in the wall of the pipe and in one of the clamps is shown. A defect will cause the uniform course of the line of force 38 to be interrupted and produce leakage flux which emanates from the surface of the pipe 15 to be stored in the storage tape 20.

After magnetization, the girdle 32 and conductor arrangement 14 are removed and the storage tape 20 taken off and scanned. Reproduction means for this purpose are available in a variety of forms, so that it is not considered necessary to describe them. Depending on the design, the defect information in the storage tape may be displayed on the screen of an electron-beam oscilloscope or on the recording paper of a recorder. In the latter case, the inspection may also produce an acceptance document of the inspected weld.

As the conductor arrangement 14, the girdle 32 is suitable for a wide range of different pipe diameters and wall thicknesses. If some clamps 16 are not required for small pipe diameters, they may be merely allowed to hang down from the ends of the rubber strip 23 without affecting operation.

Although in the case illustrated in the present example, a conductor arrangement with a single winding is utilized, a conductor arrangement with a plurality of windings located consecutively adjacent each other may be used and still come within the spirit of this invention, e.g., if an especially wide portion of the pipe is to be inspected.

Figure 4:
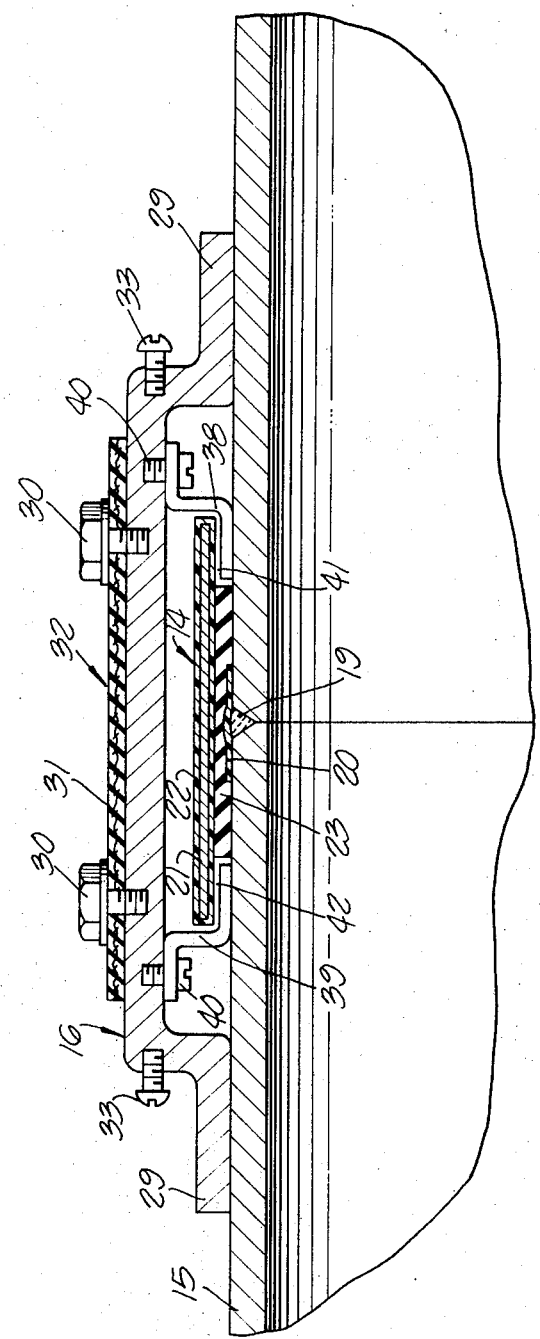
FIG. 4 illustrates a modification arranged similarly to that shown in FIG. 2.

A particularly simple means of performing the method according to the invention is achieved if the girdle 32 and conductor arrangement 14 form one unit which is drawn over the storage tape and the pipe portion to be inspected in one step. However, this necessitates that the conductor arrangement 14 can move freely relative to the clamps 16. A portion of the modification of the arrangement according to FIG. 2 required for this is illustrated in FIG. 4. Two angles, 38 and 39, each of a non-magnetic material, for example austenitic steel, are attached to the insides of the clamps 16 with the aid of screws 40. The foam rubber coating 23 on the bottom of the conductor arrangement 14 is removed from the marginal edges of 22 as at 41 and 42. The two free ends of the angles 38 and 39 extend beneath the edges of the conductor arrangement into spaces 41 and 42 not coated with foam rubber. In this manner the angles support the conductor arrangement 14 when the girdle does not rest on the wall of the pipe, and simultaneously permit the conductor arrangement to move freely about the pipe when the girdle 32 is placed on the wall of the pipe together with the conductor arrangement 14. In dimensioning the angles 38 and 39, care must be taken to insure that the ends are as small as practical to prevent difficulties in fitting the conductor arrangement to the curvature of the surface of the pipe.

The invention claimed is:

1. A method of magnetographically inspecting a circumferential portion of a ferromagnetic pipe for defects, which comprises:
    wrapping magnetic tape about the pipe portion;
    winding a band-shaped conductor over the magnetic tape;
    locating a plurality of ferromagnetic means in bridging relationship to said tape and said conductor contacting the pipe at each side thereof;
    passing an electric current through said conductor;
    removing the bridging ferromagnetic means, conductor and magnetic tape; and
    scanning the tape.

2. A method as in claim 1, in which said ferromagnetic bridging means are formed into an elongated girdle which is wrapped about the pipe over the portion to be tested.

3. Method of magnetographically testing a transverse pipe weld, which comprises:
    contactingly applying magnetic storage tape over the weld;
    wrapping at least one winding of a flexible conductor about the pipe over the tape, said conductor having a width substantially greater than the weld;
    clamping at least one ferromagnetic means over the tape and conductor contacting the pipe wall at each side thereof.

4. A method as in claim 3, in which the flexible conductor is arranged symmetrically over the weld with a substantially equal amount of the conductor extending on each side of said weld.

5. A device for magnetographic defect testing of a pipe section, comprising:
    a strip of magnetic tape encompassing the pipe section in continuous contacting relationship;
    a flexible bandlike electric current conductor wrapped over said magnetic tape substantially completely around said pipe; and
    ferromagnetic means extending axially of the pipe over the magnetic tape and conductor contacting the pipe wall at each side thereof.

6. A device as in claim 5, in which said conductor includes a braided wire cable.

7. A device as in claim 5, in which said ferromagnetic means includes a plurality of U-shaped members spaced about the pipe circumference.

8. A device as in claim 5, in which said ferromagnetic means includes a plurality of U-shaped members interconnected in mutually spaced arrangement by a flexible beltlike means.

9. A device for magnetographic defect testing of pipe section, comprising:
    a length of magnetic tape wrapped about the pipe section;
    a flexible electric current carrying conductor in surrounding relationship to said pipe section over said tape; and
    a plurality of magnetically permeable U-shaped members circumferentially spaced about said pipe section, the ends of said members bridging said tape and said conductor contacting said pipe section.

10. A device as in claim 9, in which said U-shaped members are interconnected via girdle means having end portions which are removably connected to one another when said members are received on the pipe section.

* * * * *